(12) United States Patent
Stokes

(10) Patent No.: US 6,633,101 B2
(45) Date of Patent: Oct. 14, 2003

(54) MOVING MAGNET TORQUE MOTOR

(75) Inventor: Brian P. Stokes, Windham, NH (US)

(73) Assignee: Nutfield Technology, Inc., Windham, NH (US)

( * ) Notice: Subject to any disclaimer, the term of this patent is extended or adjusted under 35 U.S.C. 154(b) by 0 days.

(21) Appl. No.: 09/891,478

(22) Filed: Jun. 26, 2001

(65) Prior Publication Data

US 2002/0195899 A1 Dec. 26, 2002

(51) Int. Cl.$^7$ .................................................. H02K 3/04

(52) U.S. Cl. ....................... 310/208; 310/254

(58) Field of Search ............................. 310/208, 36, 37, 310/38, 254, 258–260, 265, 156.01, 156.11, 156.45

(56) References Cited

U.S. PATENT DOCUMENTS 5,424,632 A * 6/1995 Montagu ..................... 324/146
5,877,574 A * 3/1999 Molnar ....................... 310/215

* cited by examiner

Primary Examiner—Thanh Lam
(74) Attorney, Agent, or Firm—Grossman Tucker Perreault & Pfleger, PLLC

(57) ABSTRACT

A torque motor configuration that minimizes off-axis magnetic forces emanating from adjacent energized coils acting on a magnet. The motor includes a stator comprising a sleeve with conductive coils disposed thereon, and the stator further defining a rotor opening, and a rotor disposed in the rotor opening comprising a magnet disposed on a shaft with the sleeve being shorter than the magnet and the coils including turn around zones beyond respective ends of the sleeve. The motor may be incorporated into an optical scanning system including optical elements for detecting light from a light source.

21 Claims, 4 Drawing Sheets

MOVING MAGNET TORQUE MOTOR

FIELD OF THE INVENTION

This invention relates to torque motors, and, in particular to a torque motor having a rotor and a stator configured for minimizing off-axis forces on the rotor.

BACKGROUND OF THE INVENTION

Torque motors are widely used for a variety of applications. One application is the use of a torque motor, in combination with a shaft position transducer, to drive optical elements in order to guide light beams. The optical element in this device can be a lens, mirror, waveplate, or the like. This type of device is often called an optical scanning galvanometer or optical scanner. There are three basic types of torque motors that are known and could be used in such an application. These include a moving coil design, a moving iron pole construction, and a moving magnet type. With the introduction of high energy or rare earth permanent magnets, the moving magnet type has become the preferred type of torque motor for optical scanners. The moving magnet design has a stationary coil, armature, and a rotating magnet that defines the field. This type of construction has a high torque constant, low inertia, low electrical inductance, and effective thermal cooling of the stationary coil.

A typical prior art moving magnet torque motor has a cylindrical sleeve that encompasses a rotating magnet. Coils made up of a multiplicity of turns of wire are arranged along the inside surface of the cylindrical sleeve. The coils reverse direction between the sleeve and the magnet. The length of the sleeve is longer than the length of the magnet. Therefore, the turn around zones are disposed circumferentially around the inner edge of the sleeve and lie within the length of the magnet. When a supplied current flows through the coils, magnetic flux lines emanate from the coils to act on the magnet. These magnetic flux lines are not directly offsetting given the position of the turn around zones relative to the magnet. This results in off-axis forces applied to the magnet and a corresponding loss of speed and accuracy for the motor.

Accordingly, there is a need in the art for a reliable motor in which off-axis forces acting on a moving magnet resulting from magnetic flux lines emanating from energized coils are minimized.

BRIEF SUMMARY OF THE INVENTION

The present invention relates to a torque motor configuration that minimizes off-axis magnetic forces generated by adjacent energized coils acting on a magnet. In particular, a motor consistent with the invention may include: a stator comprising a sleeve with conductive coils disposed thereon with the stator further defining a rotor opening; and a rotor disposed in the rotor opening comprising a magnet disposed on a shaft, the sleeve being shorter than the magnet and the coils including turn around zones beyond respective ends of the sleeve. Upon energization of the coils, a magnetic field is established that interacts with the magnet's magnetic field to impart torque on the rotor.

The magnet may be a permanent magnet or an electromagnet. There may also be a magnetically permeable outer housing enclosing the sleeve where the housing has annular slots to accept and hold the coil turn around zones.

In an exemplary application, an exemplary torque motor may be part of optical scanning system. The optical scanning system may include an optical element to direct light from a light source, and a torque motor as described earlier. The optical element may be a mirror, waveplate, or lens.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION OF THE INVENTION

Figure 1:
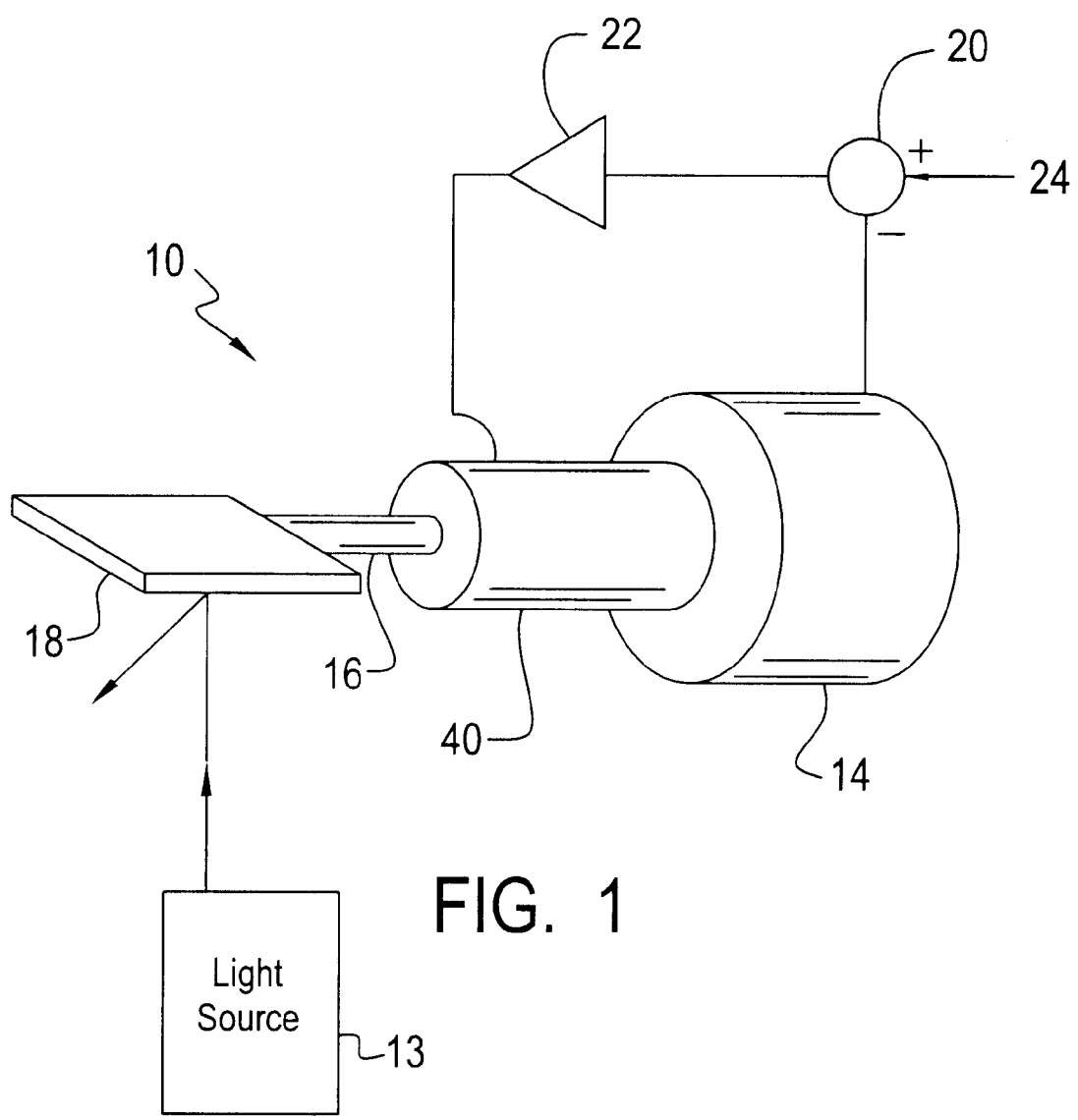
FIG. 1 is a schematic view of an exemplary optical scanning system consistent with the present invention.

With reference now to FIG. 1, there is shown an exemplary application of an exemplary torque motor 40 consistent with the invention. In the illustrated application, the torque motor 40 is part of a larger optical scanning system 10. It will be recognized by those skilled in the art, however, that this is just one application of the novel torque motor 40, and a torque motor consistent with this invention may be used in a wide variety of applications including differing optical scanner applications.

Referring to FIG. 1, an optical scanning system 10 includes: the moving magnet torque motor 40, which further includes an output shaft 16; a position sensor 14; and an optical element 18. The optical element may be a lens, mirror, waveplate, or the like used to reflect light from a light source 13. In a known manner, a subtraction circuit 20 may be connected to the feedback output of the position sensor 14, and to the input of an amplifying circuit 22. A signal 24 may be applied to the subtraction circuit 20, which compares it with the feedback signal generated in response to the rotating motion coupled to the position sensor 14. The resulting signal is amplified and used to drive the torque motor 40. The torque motor rotates the output shaft, which in turn rotates the optical element, causing it to reflect light from the light source 13 in differing directions to act on a work surface area.

Figure 2:
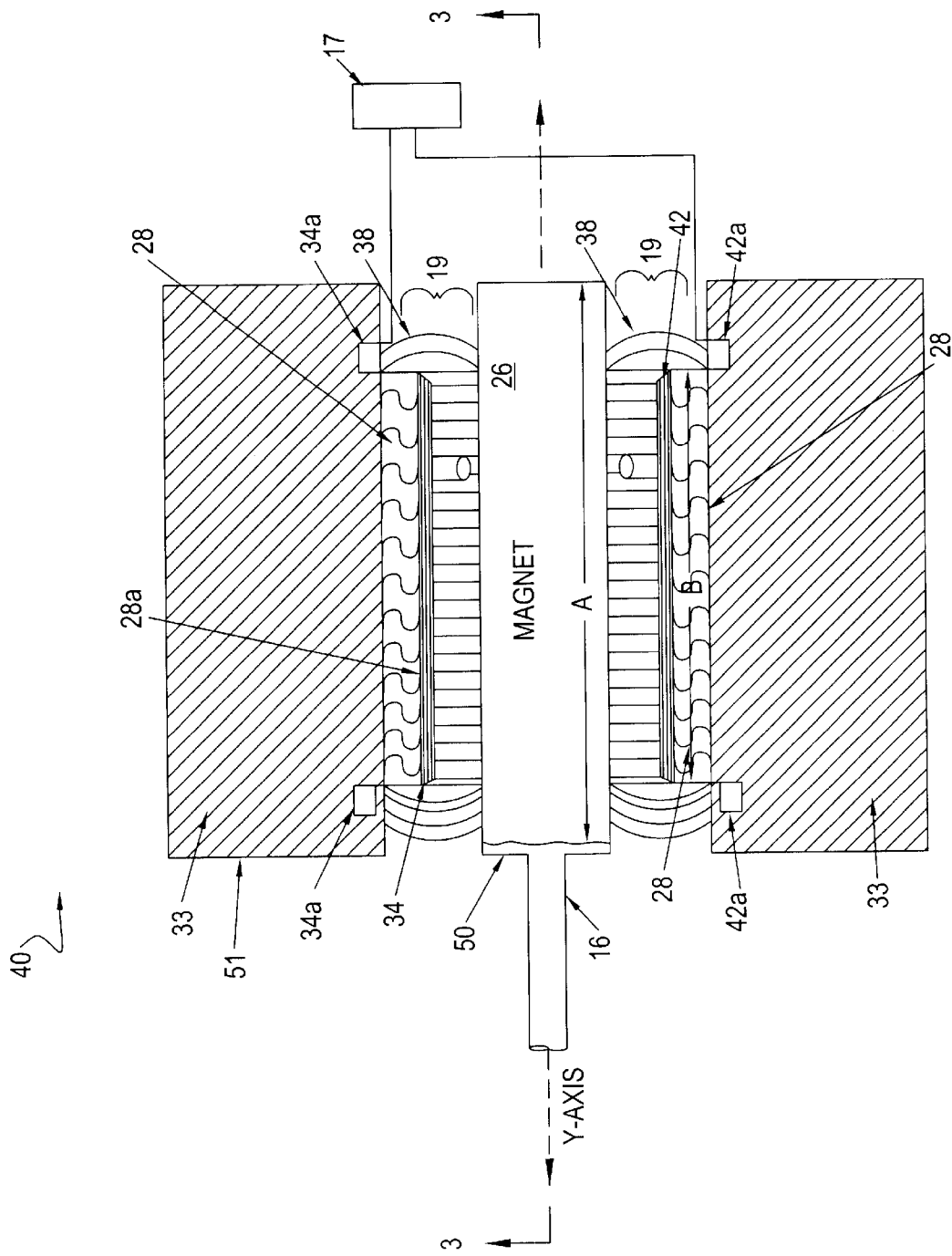
FIG. 2 is a longitudinal cross section of an exemplary moving magnet torque motor consistent with the present invention.
Figure 3:
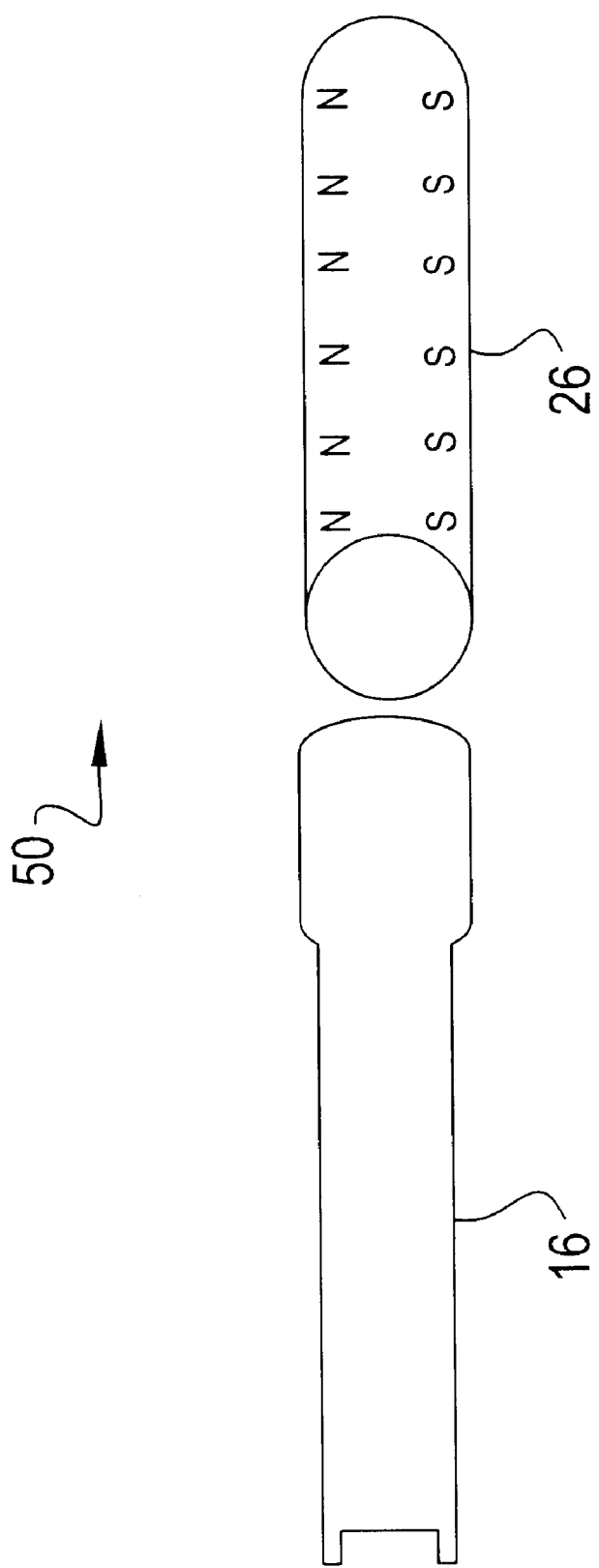
FIG. 3 is an exploded view of the rotor illustrated in FIG. 2.

Turning to FIG. 2, a cross sectional view of an exemplary torque motor 40 consistent with the present invention is shown. The motor 40 generally includes a rotor 50 and a stator 51. The rotor 50 is comprised of a magnet 26 attached to an output shaft 16. The magnet can be a permanent magnet or an electromagnet. The magnet shown in an exemplary embodiment of FIG. 2 is a permanent magnet longitudinally magnetized to include generally semi-cylindrical north and south poles. A rare earth type of permanent magnet may be utilized that is made of samarium cobalt or neodymium born or the like. An exploded view of an exemplary rotor configuration 50 is shown by itself in FIG. 3. As shown, the magnet 26 fits into an opening in the shaft 16 and can be secured with a bonding agent or epoxy.

It is advantageous to make motors with smaller and longer rotors for a given power requirement. This is because a rotor with a smaller diameter and longer length will enable the motor to have a higher torque-to-moment-of-inertia ratio than would an equivalent motor with a longer diameter rotor. This allows the motor to accelerate faster and therefore operate at higher frequencies. The magnet may be of varying shapes, and is shown in the illustrated exemplary embodiment to be of cylindrical shape. In one embodiment, the magnet's dimensions may be approximately 1 inch long with a 0.125 inch diameter.

The stator 51 is comprised of coils 34 and 42, a sleeve 28, and a magnetically permeable outer housing 33. The rotor magnet 26 is disposed inside the sleeve with the output shaft 16 protruding therefrom. The sleeve opening is of sufficient size to accept the interiorly disposed rotor 50. The sleeve may be of varying shapes, and is shown as a cylindrical shaped sleeve in an exemplary embodiment of FIG. 2. The sleeve may also be made of ferromagnetic materials such as iron, steel, cobalt, or nickel, and in one embodiment may have a thickness of 0.125 inches.

Two coils 34 and 42, made up of a multiplicity of turns or windings, are arranged along the inside portion 28a of the sleeve. Each coil is generally disposed along the y-axis as shown in FIG. 2., which is parallel to the inside portion of the sleeve. As will be understood by those skilled in the art, each coil may be connected to a power supply 17, which provides current to energize the coils.

Each coil also turns around, i.e. reverses direction, outside the sleeve in turn around zones 34a and 42a. In an exemplary embodiment, such turn around zones 34a and 42a are substantially perpendicular to the sleeve and are located in an annular opening of the outer housing to accept such turn around zones. Of course, various ways can be employed for locating and positioning the turn around zones outside of the sleeve in a manner consistent with the present invention.

As shown in FIG. 2, the magnet length A is longer than the sleeve length B. This enables the turn around zones of the coils to be located outside of the sleeve. When current passes through the coils, the resulting magnetic field lines 38 are substantially opposite each other, resulting in minimal off-axis forces on the magnet. Less off-axis forces acting on the magnet result in a more stable magnet and a faster and more reliable torque motor.

Figure 4:
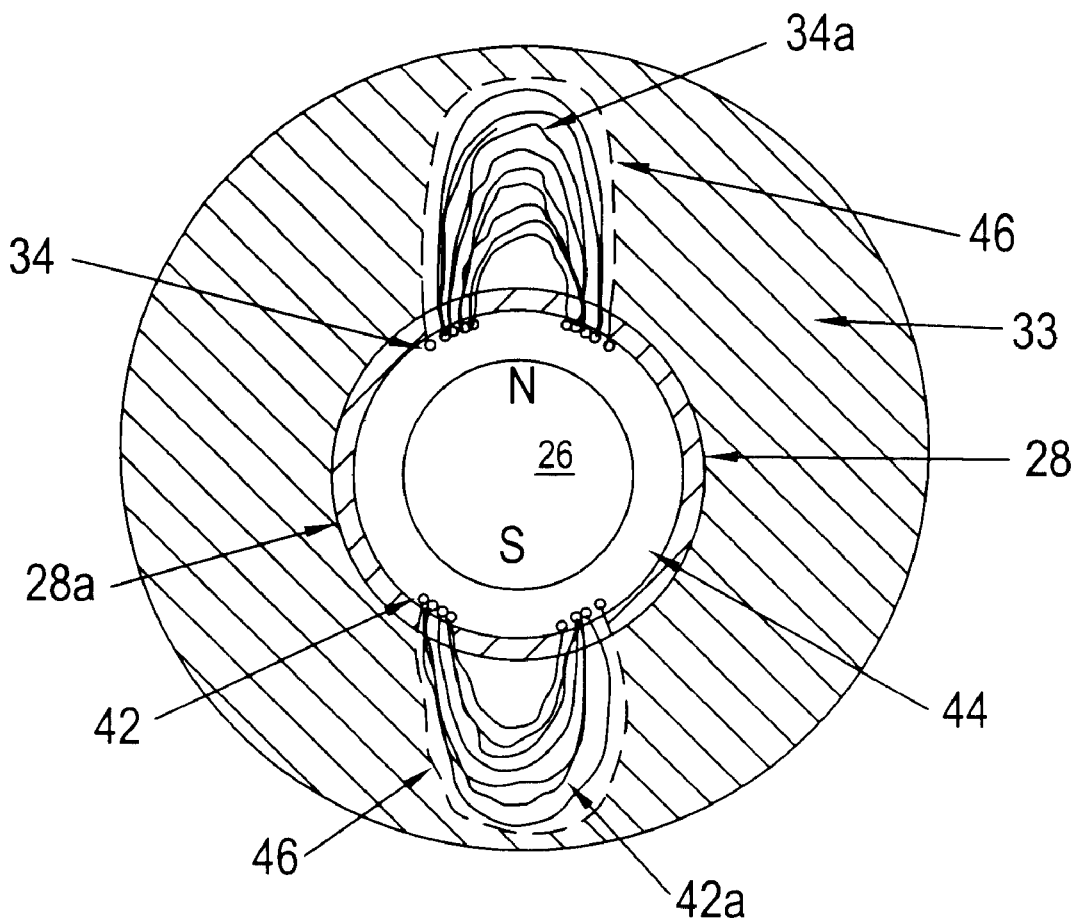
FIG. 4 is an end view of the exemplary moving magnet torque motor illustrated in FIG. 2.

FIG. 4 is an end view of an exemplary torque motor 40 consistent with the present invention. In the illustrated embodiment, the magnet is a permanent magnet longitudinally magnetized to include generally semi-cylindrical north and south poles as shown. A concentric air gap 44 is provided between the magnet and the inside edge 28a of the sleeve. Coils 34 and 42 run along the inside edge of the sleeve. The coil turn around zones 34a and 42a are situated in an annular opening 46 of the outer housing 33 large enough to accept the turn around coils zones.

In operation, current passes through the coils 34 and 42, creating a magnetic field that interacts with the magnetic field generated by the magnet 26 thereby imparting torque on the rotor. Current may be supplied to the coils from a power source 17 as shown in FIG. 2. The field lines 38 resulting from the magnetic field created by current flowing in the coils 34 and 42 are substantially opposing because the turn around zones of the coils are located outside of the sleeve. This results in less off-axis forces acting on the magnet and keeps the rotating magnet more stable. This also creates a more reliable, quicker, and stable torque motor.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A torque motor comprising:
   a stator defining a rotor opening;
   a sleeve disposed adjacent said stator within said rotor opening;
   a rotor disposed within said rotor opening, the rotor comprising a magnet disposed on a shaft; and
   independently wound conductive coils disposed on said sleeve and disposed between said sleeve and said rotor and adjacent to said stator; said sleeve being shorter than the magnet and the coils and including the turn around zones beyond respective ends of the sleeve.

2. The torque motor of claim 1 wherein the magnet comprises a substantially permanent magnetic material.

3. The torque motor of claim 2 wherein the magnet comprises two poles on opposite sides of the rotor's rotational axis.

4. The torque motor of claim 1 wherein the shaft and the magnet are aligned on the rotor's rotational axis.

5. The torque motor of claim 1 wherein the magnet comprises a rare earth magnet.

6. The torque motor of claim 1 wherein the sleeve is cylindrical.

7. The torque motor of claim 6 wherein the sleeve comprises material selected from the group consisting of: iron, steel, cobalt, or nickel.

8. The torque motor of claim 1 wherein the stator further comprises a magnetic permeable outer housing.

9. The torque motor of claim 8 wherein the outer housing comprises annular slots to accept and hold the coil turn around zones.

10. The torque motor of claim 1 wherein the turn around zones are substantially perpendicular to the sleeve.

11. An optical scanner comprising:
    an optical element configured to direct light from a light source;
    a torque motor comprising;
       a stator defining a rotor opening;
       a sleeve disposed adjacent said stator within said rotor opening;
       a rotor disposed within said rotor opening, the rotor comprising a magnet disposed on a shaft; and
       independently wound conductive coils disposed on said sleeve and disposed between said sleeve and said rotor and adjacent to said stator; said sleeve being shorter than the magnet and the coils and including the turn around zones beyond respective ends of the sleeve.

12. The optical scanner of claim 11 wherein the optical element comprises material selected from the group consisting of: mirror, waveplate, and lens.

13. The optical scanner of claim 11 wherein the magnet comprises a substantially permanent magnetic material.

14. The optical scanner of claim 13 wherein the magnet comprises two poles on opposite side of the rotational axis of the rotor.

15. The optical scanner of claim 11 wherein the shaft and the magnet are aligned on the rotor's rotational axis.

16. The optical scanner of claim 11 wherein the magnet comprises a rare earth magnet.

17. The optical scanner of claim 11 wherein the sleeve is cylindrical.

18. The optical scanner of claim 17 wherein the sleeve comprises material selected from the group consisting of: iron, steel, cobalt, or nickel.

19. The optical scanner of claim 11 wherein the stator further comprises a magnetic permeable outer housing.

20. The optical scanner of claim 19 wherein the magnetic permeable outer housing comprises annular slots to accept and hold the coil turn around zones.

21. The optical scanner of claim 11 wherein the turn around zones are substantially perpendicular to the sleeve.

* * * * *